(12) United States Patent
Oldfield et al.

(10) Patent No.: US 6,567,891 B2
(45) Date of Patent: May 20, 2003

(54) METHODS AND ARRANGEMENTS FOR IMPROVED STRIPE-BASED PROCESSING

(75) Inventors: Barry J Oldfield, Boise, ID (US); Robert A. Rust, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 81 days.

(21) Appl. No.: 09/808,648

(22) Filed: Mar. 14, 2001

(65) Prior Publication Data

US 2003/0023809 A1 Jan. 30, 2003

(51) Int. Cl.$^7$ ............................................ G06F 12/00
(52) U.S. Cl. ........................... 711/114; 711/112; 714/6; 714/52; 714/770; 714/784
(58) Field of Search ............................. 711/114, 112, 711/166; 714/6, 770, 784

(56) References Cited

U.S. PATENT DOCUMENTS

| | | | |
|---|---|---|---|
| 5,134,619 A | * | 7/1992 | Henson et al. ............... 714/770 |
| 5,734,859 A | * | 3/1998 | Yorimitsu et al. ........... 711/112 |
| 5,954,822 A | * | 9/1999 | Yashiro et al. ................. 714/6 |
| 6,148,430 A | * | 11/2000 | Weng ........................... 714/770 |
| 6,151,641 A | * | 11/2000 | Herbert ........................ 710/22 |
| 6,341,342 B1 | * | 1/2002 | Thompson et al. ......... 711/166 |

* cited by examiner

Primary Examiner—Do Hyun Yoo
Assistant Examiner—Ngoc V Dinh

(57) ABSTRACT

A disk controller includes memory that is accessible by both a microprocessor and hardware parity logic. Parity-related operations are identified by scenario, and parity coefficient subsets are stored in a memory table for each different parity-related calculation scenario. To perform a particular parity-related operation, the microprocessor determines the operation's scenario and identifies the corresponding coefficient subset. The hardware parity logic is then instructed to perform the appropriate parity computation, using the identified coefficient subset. Parity segments are calculated by a parity segment calculation module that is embodied as an application specific integrated circuit (ASIC). The ASIC includes one or more local result buffers for holding intermediate computation results, one or more mathematical operator components configured to receive data strips, which are portions of larger data stripes, coefficients associated with the data strips, and operates on them to provide intermediate computation results that can be written to the local result buffers Upon completing the parity processing of a strip, the results are then stored in an external memory (e.g., RAM). Upon completing the processing of all of the strips in a stripe, the final parity results are written to applicable sections of a stripe-based disk array.

18 Claims, 6 Drawing Sheets

METHODS AND ARRANGEMENTS FOR IMPROVED STRIPE-BASED PROCESSING

RELATED PATENT APPLICATIONS

This patent application is related to U.S. patent applications with Ser. Nos. 09/808,713, filed Mar. 14, 2001; 09/808,910 filed Mar. 14, 2001; 09/808,711 filed Mar. 14, 2001, each of which is incorporated herein by reference and for all purposes.

TECHNICAL FIELD

This invention relates to parity operations in redundant disk drive systems, and particularly to improved stripe-based processing methods and arrangements in such systems.

BACKGROUND

Modem, high-capacity data storage systems often utilize a plurality of physical disk drives for redundant storage of data. Such arrangements speed-up data access and protect against data loss that might result from the failure of any single disk.

There are two common methods of storing redundant data. According to the first or "mirror" method, data is duplicated and stored on two separate areas of the storage system. In a disk array, for example, identical data is stored on two separate disks. This method has the advantages of high performance and high data availability. However, the mirror method is also relatively expensive, effectively doubling the cost of storing data.

In the second or "parity" method, a portion of the storage area is used to store redundant data, but the size of the redundant storage area is less than the remaining storage space used to store the original data. For example, in a disk array having six disks, five disks might be used to store data, with the sixth disk being dedicated to storing redundant data, which is referred to as "parity" data. The parity data allows reconstruction of the data from one data disk, using the parity data in conjunction with the data from surviving disks. The parity method is advantageous because it is less costly than the mirror method, but it also has lower performance and availability characteristics in comparison to the mirror method.

This invention involves storing redundant data according to parity techniques. In conventional disk arrays utilizing parity storage, the space on the storage disks are configured into multiple storage stripes, where each storage stripe extends across the storage disks. Each stripe consists of multiple segments of storage space, where each segment is that portion of the stripe that resides on a single storage disk of the disk array.

FIG. 1 illustrates a conventional disk array 12 having six storage disks 13. In this simplified example, there are five storage stripes extending across the storage disks. FIG. 1 highlights data and storage segments of a single one of these five stripes. Data segments of the indicated stripe are indicated by cross-hatching. The corresponding parity segment of this same stripe is illustrated in solid black. Generally, of the six segments comprising any given stripe, five of the segments are data segments and the sixth segment is a parity segment.

This type of parity storage is referred to as 5+1 parity storage, indicating that there are five data segments for every single parity segment. This scheme is more generally referred to as N+1 grouping, where N is the actual number of data segments in a data stripe.

N+1 redundancy grouping such as illustrated in FIG. 1 protects against the loss of any single physical storage device. If the storage device fails, its data can be reconstructed from the surviving data. The calculations performed to recover the data are straightforward, and are well known. Generally, a single parity segment P is calculated from data segments $D_0$ through $D_{N-1}$ in accordance with the following equation:

$$P = x_0 + x_1 + x_2 + x_{N-1}$$

where $x_0$ through $x_{N-1}$ correspond to the data from data segments $D_0$ through $D_{N-1}$. After the loss of any single data segment, its data can be recovered through a straightforward variation of the same equation.

In many systems, however, it is becoming important to protect against the loss of more than a single storage device. Thus, it is becoming necessary to implement N+2 grouping in redundant storage systems.

While N+2 redundancy grouping enhances data protection, it also involves more complex calculations-both in initially calculating parity segments and in reconstructing any lost data segments.

A general form of the N+2 parity computation is as follows:

$$P = p_0 x_0 + p_1 x_1 + p_2 x_2 + p_{N-1} x_{N-1}$$

$$Q = q_0 x_0 + q_1 x_1 + q_2 x_2 + q_{N-1} x_{N-1}$$

where:
  P is the value of a first parity segment;
  Q is the value of a second parity segment;
  $x_0$ through $x_{N-1}$ are the values of the data segments
  $p_0$ through $p_{N-1}$ and $q_0$ through $q_{N-1}$ are constant coefficients that are particular to a given parity scheme.

These equations form a two-equation system that, by the rules of linear algebra, can potentially solve for any two unknowns $x_a$ through $X_b$, which represent the data from a single stripe of any two failed storage devices. One requirement is that the two sets of coefficients $p_i$ and $q_i$ be linearly independent. This requirement is met, for example, if $p_0=1$, $p_1=1$, $p_2=1$; etc.; and $q_0=1$, $q_1=2$, $q_2=3$; etc. Other examples are also possible.

The mathematics of N+2 parity are well known and are not the primary subject of this description. However, it is apparent from the brief description given above that N+2 parity computations are significantly more complex than N+1 parity computations. In actual implementations of N+2 disk arrays, this complexity threatens to limit the data throughput of storage device controllers and, consequently, of the overall disk array.

Of particular interest herein, is the need to identify potential performance bottlenecks in the processing of stripe-based data and provide solutions that significantly increase the throughput of the overall system.

SUMMARY

In accordance with certain aspects of the present invention, a performance bottleneck has been identified as occurring during conventional processing of stripe-based data. As such, improved methods and arrangements are provided to address the bottleneck and help increase the throughput of the overall stripe-based data processing system.

The above stated needs and others may be met, for example, by a method that includes selectively reading data segments or strips within a stripe-based data storage array, and while reading subsequent data strips, calculating at least one intermediate parity value based on previously read data strips and temporarily storing this latest intermediate parity value in a local buffer. Upon determining a final parity value for the strip, writing the final parity value to an external memory. Then, upon determining a final parity value for an entire stripe, writing the final parity value to a corresponding parity value data segment in on an applicable disk drive. The method can be employed in a variety of stripe-based data storage arrays. By way of example, the method can be employed in an N+2 disk array to determine P and Q parity values. One of the benefits to this method is that each data segment need only be read from the disk one time, and further, only the final calculated value of each parity value is written to the applicable disks. Hence, the overall system performance is increased by eliminating the need to reread data segments and write/rewrite intermediate parity values to the external memory.

DETAILED DESCRIPTION

Parity Operations

Figure 2:
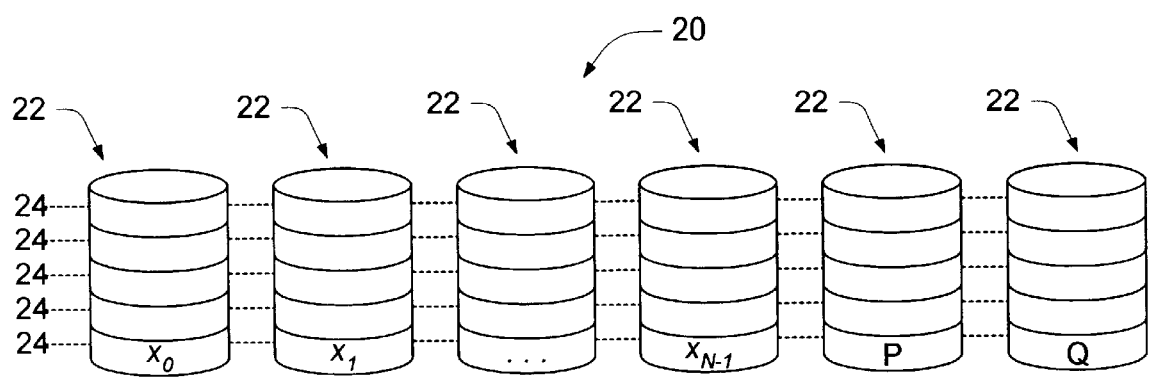
FIG. 2 is a block diagram showing N+2 redundancy grouping as used in the described embodiment of the invention.

Referring to FIG. 2, a redundant data storage system 20 in accordance with the invention utilizes storage disks 22 with data stripes 24. Each data stripe 24 comprises a plurality of data segments (or strips) $x_0$ through $x_{N-1}$ and at least two corresponding parity segments P and Q. P and Q are derived from the data segments $x_0$ through $x_{N-1}$, from a first set of parity coefficients $p_0$ through $p_{N-1}$, and from a second set of parity coefficients $q_0$ through $q_{N-1}$. The parity coefficients correspond to respective data segments in accordance with the equations below:

$$P=p_0x_0+p_1x_1+p_2x_2+\ldots+p_{N-1}x_{N-1}$$

$$Q=q_0x_0+q_1x_1+q_2x_2+\ldots+q_{N-1}x_{N-1}$$

The parity operations, as described herein, can be classified as: 1) parity segment generation operations, 2) parity segment regeneration operations, or 3) data segment reconstruction operations.

1) A parity segment generation operation is performed when creating a new data stripe, i.e., the parity segments are created based on completely new data.

2) A parity segment regeneration operation is performed with respect to an existing stripe, either when new data causes the addition of a new data segment or when a read/modify/write cycle modifies one or more existing data segments. In a parity segment regeneration operation, the parity segments are modified incrementally, without reading an entire data stripe. For example, suppose that new data causes the addition of a new data segment $X_4$. $P_{NEW}$ is calculated as follows:

$$P_{NEW}=P_{OLD}+p_4x_4$$

Similarly, suppose that data segment $x_2$ is modified as the result of a read/modify/write cycle. In this case, $P_{NEW}$ is calculated as follows:

$$P_{NEW}=P_{OLD}-p_2x_{2OLD}+p_2x_{2NEW}$$

Calculating new P and Q values from the old data segment values involves significantly fewer memory reads than calculating P and Q from scratch after every stripe modification.

With the above description in mind, therefore, parity segment regeneration operations can be further classified as being either parity regenerations (i.e., resulting from added data segments) or parity regenerations (i.e., resulting from a modified data segment).

3) Data segment reconstruction operations include two sub-classifications:

a) single data segment reconstruction operations, and 2) double data segment reconstruction operations.

a) A single data segment can be reconstructed from either the P or the Q parity segment in combination with the surviving data segments. Generally, a data segment $x_a$ is reconstructed from either parity segment P or Q as follows:

$$x_a=f(p_0, p_a)x_0+f(p_1, p_a)x_1+\ldots+f(p_a)P+\ldots+f(p_{N-1}, p_a)x_{N-1}$$

$$x_a=f(q_0, q_a)x_0+f(q_1, q_a)x_1+\ldots+f(q_a)Q+\ldots+f(q_{N-1}, q_a)x_{N-1}$$

where f( ) is a transformation function that generates an appropriate coefficient particular to the parity generation code being used.

b) Two data segments can be reconstructed from the P and the Q parity segments in combination with the surviving data segments.

Generally, two data segments $x_a$ and $x_b$ are reconstructed from parity segments P and Q as follows:

$$x_a = f(p_0, q_0, p_a, p_b, q_a, q_b)x_0 + f(p_1, q_1, p_a, p_b, q_a, q_b)x_1 + \ldots + f(p_a, p_b, q_a, q_b)P + \ldots + f(p_{N-1}, q_{N-1}, p_a, p_b, q_a, q_b)x_{N-1}$$

$$x_b = f(p_0, q_0, p_a, p_b, q_a, q_b)x_0 + f(p_1, q_1, p_a, p_b, q_a, q_b)x_1 + \ldots + f(p_a, p_b, q_a, q_b)Q + \ldots + f(p_{N-1}, q_{N-1}, p_a, p_b, q_a, q_b)x_{N-1}$$

where f(), again, is a transformation function that generates an appropriate coefficient particular to the parity generation code being used.

Generally, all of the parity operations described above can be accomplished by using a different combination of known coefficients chosen from a base set having a finite number of such coefficients. These coefficients include $p_0\bar{}p_{N-1}$, $q_0\bar{}q_{N-1}$, and the coefficients resulting from the transform functions f().

Any particular parity operation utilizes a subset of these coefficients, depending on the actual data or parity segment being calculated. The particular subset of coefficients needed for a particular calculation depends on both the classification of the operation and upon the specific data and/or parity segments involved. Thus, within a given classification of parity operation, there are different situations or scenarios, each of which calls for a different subset of coefficients.

For example, one scenario occurs when adding data segment $X_5$ to a stripe, when coefficients $p_5$ and $q_5$ are needed. Another scenario occurs when adding data segment $x_6$ to a stripe, when coefficients $p_6$ and $q_6$ are needed.

Coefficient Subsets

Figure 3:
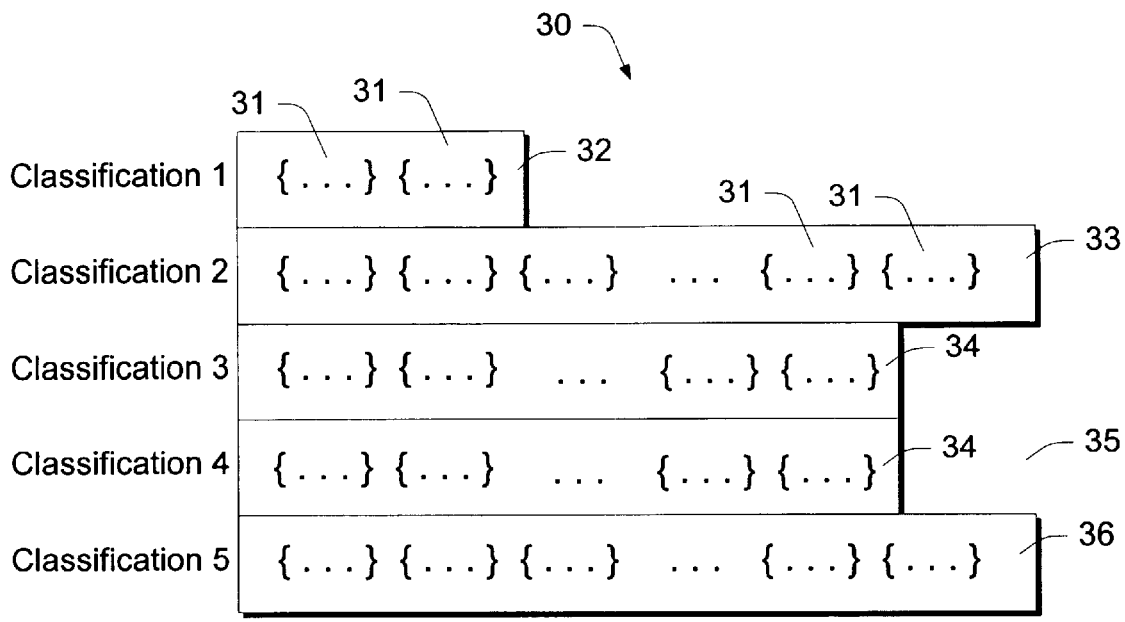
FIG. 3 is a block diagram illustrating layout of a memory table in accordance with the invention.

FIG. 3 depicts a memory array 30 that contains a plurality of coefficient subsets 31. Each coefficient subset is an organized listing or concatenation of pre-selected and/or pre-computed coefficients that are applied to corresponding segments of data to produce a parity computation result.

In accordance with certain exemplary implementations, a different subset of coefficients is pre-selected and stored for each different operation scenario. The subsets are then formatted and packed in a linear memory array for reference and direct use by parity operation logic. Because different scenarios call for different numbers of coefficients, the subsets are not necessarily of the same length or size.

In the described implementation, each coefficient is a single byte long. The term "packed" means that the subsets or strings of coefficients are concatenated in linear memory, preferably with no intervening unused spaces, to conserve storage space.

As such, there will be a one-to-one correspondence between a coefficient in a subset and a segment of data (either a data segment or a parity segment) when performing the parity operation. Each coefficient is applied only to its corresponding data segment or parity segment to produce the result of the operation.

One coefficient subset is included in the array for each possible parity computation scenario. Unique indexing formulas can be employed to locate the beginning of a subset in the array for each specific computational scenario. Generally, the subsets are arranged in pairs, corresponding to computations involving P and Q, respectively.

Referring to FIG. 3, memory array 30 includes a plurality of classification groups 32, 33, 34, 35, and 36, each of which contains the coefficient subsets 31 corresponding to a particular parity operation classification. Each subset in a classification group has coefficients for a specific scenario that occurs within the group's classification.

Within array 30, particular classification groups can be located by computing a group offset from the beginning of the array to the beginning of the group. This "group offset" may therefore serve as the base index into the array for the group. Hence, to locate a specific coefficient subset within a classification group, a subset offset from the beginning of the group need only be added to the base index. This produces an index into the array that locates the beginning of the desired coefficient subset.

In accordance with certain further implementations, five general parity operation classifications are thusly defined as follows:

1) Parity Generation Operations-Partial or full new stripe that has no pre-existing data or parity.
2) Parity Regeneration Operations Resulting From Added Segments-Incremental growth of a stripe by incorporating new data segments into the two parity segments.
3) Parity Regeneration Operations Resulting From Segment Modification—Modification of a data segment that is already incorporated in the two parity segments (read/modify/write).
4) Single Data Segment Reconstruction—Reconstruction of a single data segment using one of the parity segments and the surviving data segments from the strip. Reconstruction from either P or Q parity segments is supported because in the case of two failed storage devices, one of the failed storage devices may hold P or Q.
5) Double Data Segment Reconstruction—Reconstruction of two data segments of a stripe using the two parity segments P and Q, and the surviving data segments from the stripe.

Structure of Classification 1 Coefficient Subsets

The first classification group 32 of the array contains the coefficient subsets for parity generation operations. A parity generation operation generates new P and Q segments from new data segments $x_0$ through $x_{N-1}$. There are only two coefficient subsets in this classification group. The subsets correspond respectively to the generation of parity segments P and Q:

P: $\{p_0, p_1, \ldots p_{N-1}\}$ and

Q: $\{q_0, q_1, \ldots q_{N-1}\}$

Each of these subsets is the same length (N).

Structure of Classification 2 Coefficient Subsets

The second classification group 33 of the array contains the coefficient subsets for parity operations that add incrementally to a stripe. This type of operation updates P and Q segments in combination with any given contiguous range of new or added data segments $x_a$ through $x_b$ (where b<N and a<=b). There are multiple different scenarios of these operations, corresponding to every possible range a through b of data segments within data segments 0 through N-1. Each scenario calls for a different subset of coefficients.

For example, if the new or added data segments are $X_3$ and $X_4$, the required coefficient subset to calculate P is $\{p_3, p_4\}$. If the new or added data segments are $x_2$ through $x_5$, the required coefficient subset to calculate P is $\{p_2, p_3, p_4, p_5\}$. The total of possible ranges within data segments 0 through N-1 depends on the value of N.

Each coefficient subset of classification group 2 contains two initial parameters that indicate whether the subset applies to calculations of P or to calculations of Q. Each of these initial parameters is set to either "0" or "1". A value of "1" for the first of these coefficients indicates that the calculation involves parity segment P. A value of "1" for the second of these coefficients indicates that the calculation involves parity segment Q. Only one of these two parameters should be set equal to "1" at any given time.

The remaining coefficients in a Classification 2 subset are the sub-range of coefficients that are used to regenerate P and Q from newly added data stripes. Thus, the classification group contains a plurality of coefficient subsets of the form:

P: $\{1, 0, p_a, \ldots p_b\}$ and

Q: $\{0, 1, q_a, \ldots q_b\}$

Classification group 33 includes a plurality of subsets such as these, depending on N, corresponding to every range of a through b, within the larger range of 0 through N-1. The coefficient subsets in this section of the array have varying lengths or sizes, equal to b-a for each operation scenario.

Within this classification group, coefficient subsets are preferably arranged and grouped by length. That is, the coefficient subsets containing the smallest number of coefficients are placed in the initial part of the classification group. The coefficient subsets containing the largest number of coefficients are placed at the end of the classification group. Within each of these groupings, the coefficient subsets are arranged in order according to the lower coefficient subscript of the range that is covered by the coefficient subset. Thus, the subsets having a=0 are positioned first, the subsets having a=1 next, and so on.

Structure of Classification 3 Coefficient Subsets

The coefficient subsets in the third classification group 34 are used to update P and Q when a single data segment is modified. This type of operation updates P and Q segments, given a modified data segment $x_a$.

As with the Classification 2 group, the first two parameters of each Classification 3 subset indicate whether the coefficients of the group are applicable to P calculations or Q calculations. Each of these coefficients is set to either "0" or "1". A value of "1" for the first of these coefficients indicates that the subset coefficients apply to parity segment P. A value of "1" for the second of these coefficients indicates that the subset coefficients apply to parity segment Q.

Each subset contains a single remaining coefficient, corresponding to the data segment $x_a$ that is being modified:

P: $\{0, 1, p_a\}$ and

Q: $\{0, 1, q_a\}$

The third classification group 34 includes N pairs of such subsets, corresponding to all values of a from 0 through N−1. Note that these subsets correspond to a special case of the Classification 2 coefficient subsets, in which a=b, and can therefore be used when adding a single new data segment to a stripe.

Structure of Classification 4 Coefficient Subsets

The coefficient subsets in the fourth classification group 35 are used to reconstruct a single data segment $x_a$ based on one of the parity segments and the surviving data segments. The coefficients correspond closely to the Classification 1 coefficients, except that they are transformed according to the mathematics (f()) of the chosen error correction code to perform a reconstruction operation:

P: $\{f(p_0, p_a), f(p_1, p_a), \ldots, f(p_a), \ldots, f(p_{N-1}, p_a)\}$

Q: $\{f(q_0, q_a), f(q_1, q_a), \ldots, f(q_a), \ldots, f(q_{N-1}, q_a)\}$

The fourth classification group includes N pairs of such subsets, corresponding to all values of a from 0 through N−1. Note that in each subset, the coefficient $f(p_a)$ or $f(q_a)$ corresponds to data segment $x_a$.

Structure of Classification 5 Coefficient Subsets

The coefficient subsets in the fifth classification group 36 are used to reconstruct two data segments $x_a$ and $x_b$ based on the two parity segments and the surviving data segments. The coefficients correspond closely to the Classification 1 coefficients, except that they are transformed according to the mathematics (f( )) of the chosen error correction code to perform a reconstruction operation:

P: $\{f(p_0, q_0, p_a, p_b, q_a, q_b), f(p_1, q_1, p_a, p_b, q_a, q_b), \ldots, f(p_a, p_b, q_a, q_b), \ldots, f(p_{N-1}, q_{N-1}, p_a, p_b, q_a, q_b)\}$ Q: $\{f(p_0, q_0, p_a, p_b, q_a, q_b), f(p_1, q_1, p_a, p_b, q_a, q_b), \ldots, f(p_a, p_b, q_a, q_b), \ldots, f(p_{N-1}, q_{N-1}, p_a, p_b, q_a, q_b)\}$ The fifth section of the array includes (N*(N−1))/2 pairs of such subsets, corresponding every possible combination of a and b within the range of 0 to N−1. Note that in each subset, the coefficient $f(p_a, p_b, q_a, q_b)$ corresponds to data segment $x_a$ or $x_b$, depending on which data segment is being reconstructed.

Coefficient Subset Usage

Figure 4:
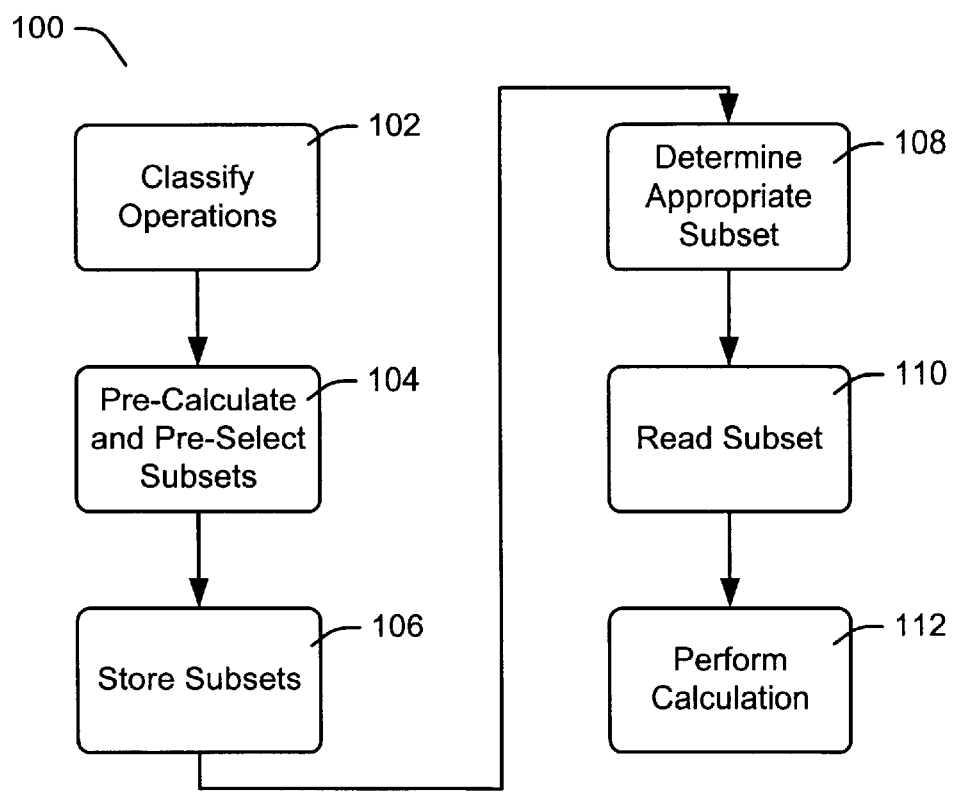
FIG. 4 is a flowchart illustrating preferred steps in accordance with certain exemplary implementations of the present invention.

FIG. 4 illustrates a method 100 of performing parity operations in accordance with the array storage scheme described above. Step 102 comprises classifying different parity operations into classifications that include parity segment generation operations, parity segment regeneration operations, and data segment reconstruction operations.

More specifically, in light of the foregoing description, an operation is classified as being either: 1) a parity generation operation, 2) a parity regeneration operation resulting from added segments, 3) a parity regeneration operation resulting from segment modification, 4) a single data segment reconstruction operation, or 5) a double data segment reconstruction operation. Each classification of parity operations includes a plurality of different classification scenarios, each of which involves a respective subset of parity coefficients.

Next, step 104 comprises pre-calculating individual parity coefficients and pre-selecting subsets of parity coefficients for use in the different parity operations and the different scenarios of parity operations. This step is performed in accordance with the description already given.

Step 106 comprises storing all of the pre-selected parity coefficient subsets in an indexed linear memory array or the like, where they can be selectively accessed by parity computation logic.

Thus, step 106 may include pre-formatting the coefficient subsets so that they can be efficiently utilized by hardware-based parity operation logic. In particular, the individual coefficients of each subset may be "packed" in adjacent bytes or other sized storage units and arranged in a manner that is particular to the hardware-based parity operation logic.

As a result of step 106, the memory array contains a single coefficient subset corresponding to each different computation scenario.

In certain implementations, the individual coefficients and the subsets of coefficients are packed with no intervening data elements. The subsets of the array are grouped and ordered as already described, with the coefficient subsets grouped into classification groups by order of their classifications. Within the second classification group, the subsets have varying sizes. In addition, the subsets in the second classification group are sub-grouped by size, and ordered in ascending order according to their lowest-numbered coefficient.

During parity operations, parity operation logic accesses the memory array to obtain the appropriate coefficient subsets for use in the different scenarios of parity operations. Thus, the parity operation logic performs a step 108 of determining which of the stored subsets of parity coefficients is needed for a particular parity operation. Step 108 involves determining the classification of the parity operation and a group offset into the linear memory array or the like, indicating the beginning of the classification group corresponding to that parity operation classification. A subset offset is then calculated into the group, to the location of the desired coefficient subset.

Step 108 is fairly straightforward except with regard to the second classification group. As described in detail above, the second classification group contains coefficient subsets of varying lengths or sizes, making it difficult to determine the offset of a particular coefficient subset.

The present invention overcomes such difficulties by recognizing that when the second classification group is arranged as described, having ordered subgroups of same-sized coefficient subsets, an offset to a particular subgroup can be calculated as a function of the size of the coefficient subsets of the sub-group and of N (the largest number of coefficients contained by any sub-group). Specifically, the offset to a particular sub-group i corresponding to subset size $L_i$ is equal to $$((L_i-1)(12N+L_i(3N-2L_i-5))/6)-3(N-1).$$

This formula assumes the presence in each subset of the prepended pair of constants (described above) corresponding to P and Q, L, however, equals b−a. Within the sub-group i, the offset of a particular coefficient subset is equal to $a(L_i+2)$. Thus, the overall offset into the classification group, for a range of coefficients corresponding to $x_a$ through $x_b$, is $$(((L_i-1)(12N+L_i(3N-2L_i-5))/6)-3(N-1))+a(L_i+2).$$

The size of the second classification group is given by the following equation:

$$((N-1)(12N+N(3N-2N-5))/6)-3(N-1).$$

After determining the appropriate offset into the memory array, a step 110 is performed of reading the determined parity coefficient subset from memory. Step 112 comprises performing the particular parity operation with the subset of parity coefficients read from memory.

Disk Controller Operation

Figure 5:
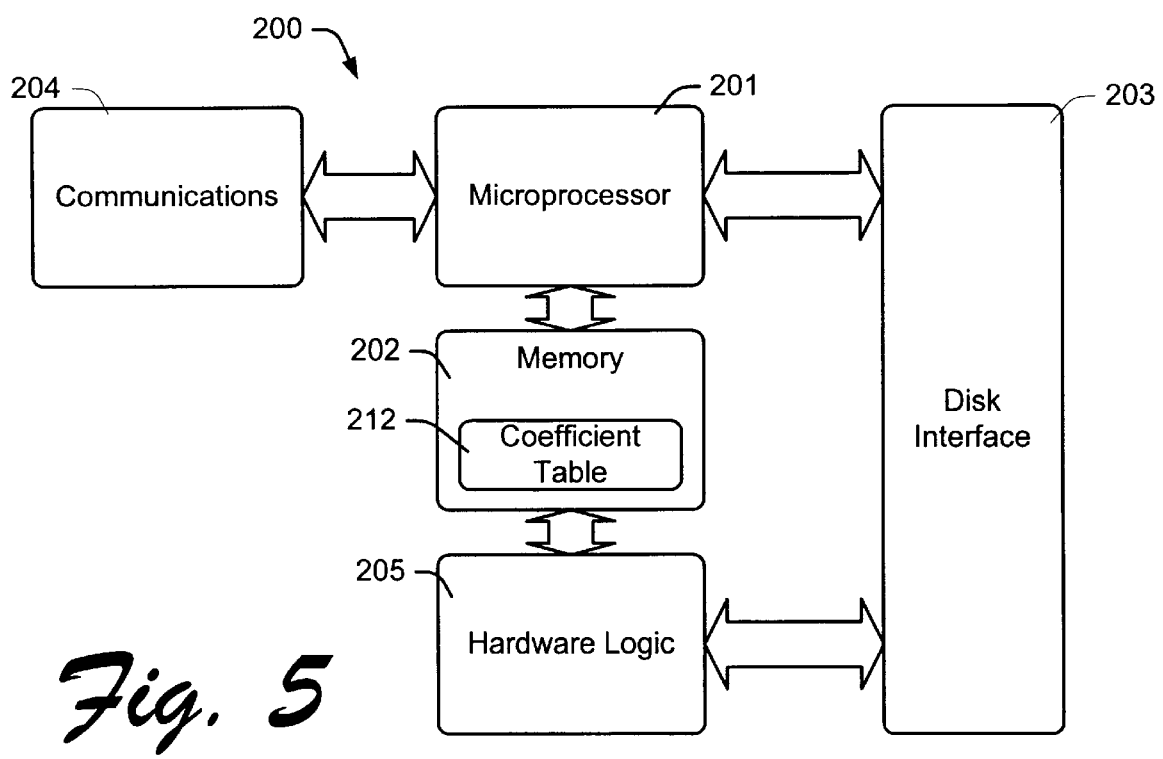
FIG. 5 is a block diagram showing pertinent components of a disk controller in accordance with certain exemplary implementations of the present invention.

FIG. 5 depicts various components of an exemplary disk controller 200 in accordance with certain implementations of the present invention. Disk controller 200 includes a microprocessor 201 and associated memory 202. In addition, disk controller 200 includes a hard disk interface component 203 and a communications component 204. Hard disk interface component 203 is operatively configured to provide access to the hard disks 22 associated with and controlled by disk controller 200. Communications component 204 acts as an interface between a host computer (not shown) and hard disk controller 200.

In addition to these components, hard disk controller 200 includes hardware-based parity operation logic 205 in the form of an application-specific integrated circuit (ASIC). The term "hardware-based" is intended to mean that this logic component, as opposed to software-based logic, does not retrieve and execute instructions from program memory. Rather, the logic component has dedicated, interconnected logic elements that process signals and data. Although hardware-based logic such as this is less flexible than a microprocessor or other instruction-based processors, hardware-based logic is often much faster than instruction-based logic. As depicted, parity operation logic 205 has access to memory 202.

In general, disk controller 200 operates as follows. Microprocessor 201 handles communications with the host computer and coordinates all data transfers to and from a host controller (not shown), via communications component 204. In addition, microprocessor 201 coordinates all actual disk transfers. However, data is buffered in memory 202 prior to writing to disk. Parity operations are performed on data in memory 202 under the control of microprocessor 201, and/or on data within parity operation logic 205

During initialization, microprocessor 201 constructs a coefficient subset table 212 in memory 202. Subsequently, when it is time for a parity operation, microprocessor 201 determines the classification and scenario of the parity operation. Once this information is determined, microprocessor 201 creates a script that indicates the locations in memory 202 of one or more data segments and parity segments that will be the object of the parity operation. The script indicates an offset into the coefficient subset table at which the proper coefficient subset will be found for the parity operation, and the number of coefficients that are contained in the coefficient subset. The script also indicates the location in memory at which the result of the requested calculation is to be placed. The script is stored in at a predetermined location in memory 202.

When a script is placed in memory, parity operation logic 205 is notified and responds by (a) retrieving the designated coefficients, data segments, and parity segments, (b) performing the appropriate parity operation based on the designated coefficients, and (c) returning the data and/or calculated parity segments to memory.

In this example, parity operation logic 205 is configured to perform the various different parity operations by summing products of coefficients and data/parity segments. The different operations actually vary only in the number and choice of coefficients, data segments, and parity segments. These variables are specified by the script. Thus, the operations lend themselves very conveniently to hardware-based calculations.

Result Buffers

One of the goals of the presently described system is to generate or calculate the parity segments, in this case P and Q, as quickly and efficiently as possible. Recall that the parity segments are calculated from the data segments $x_0$ through $x_{N-1}$, from a first set of parity coefficients $p_0$ through $p_{N-1}$, and from a second set of parity coefficients $q_0$ through $q_{N-1}$ in accordance with the following equation, which is discussed in detail above:

$$P = p_0 x_0 + p_1 x_1 + p_2 x_2 + \ldots + p_{N-1} x_{N-1}$$

$$Q = q_0 x_0 + q_1 x_1 + q_2 x_2 + \ldots + q_{N-1} x_{N-1}.$$

Figure 6:
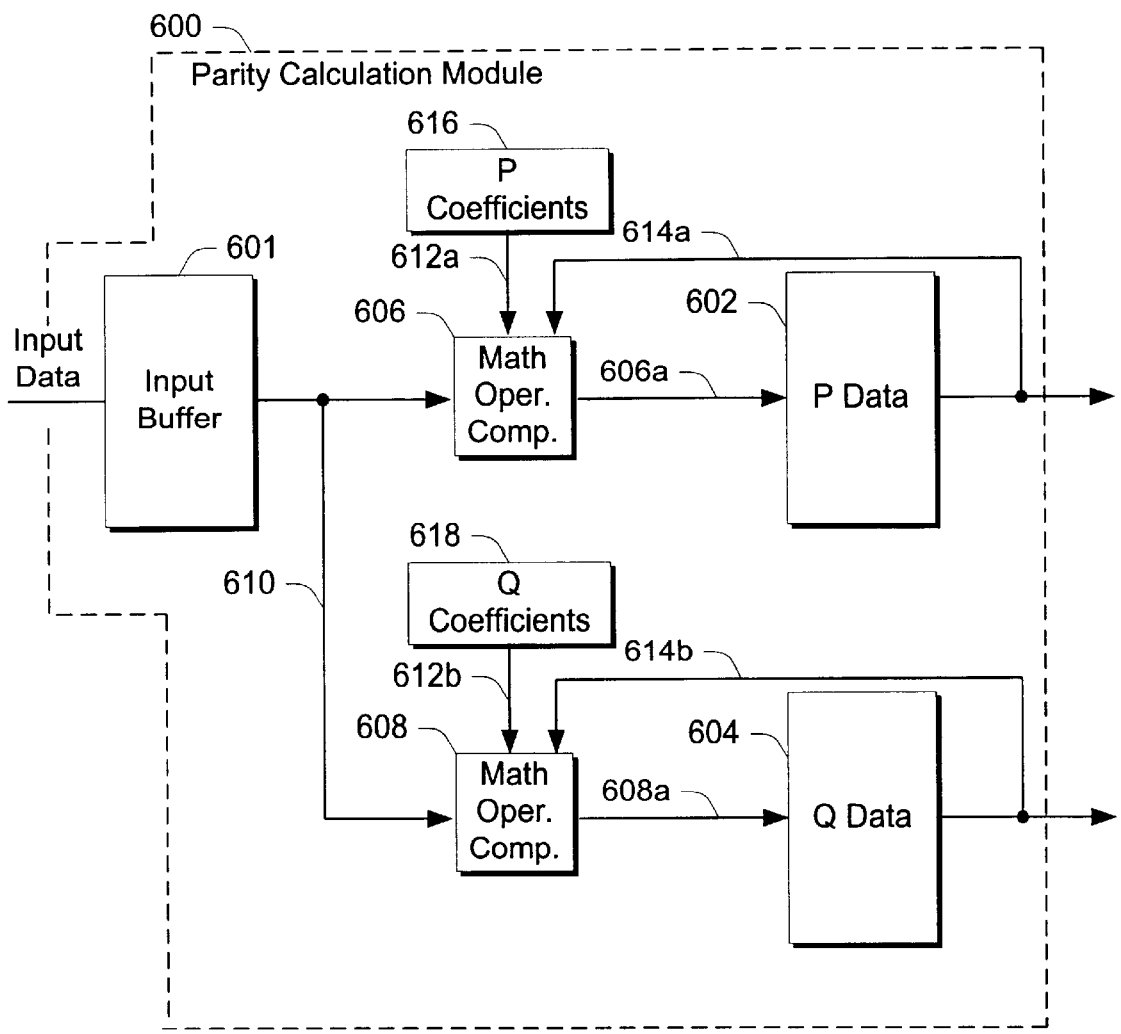
FIG. 6 is a block diagram of an exemplary parity calculation module in accordance with certain exemplary implementations of the present invention.

One way of calculating P and Q is to read in, from external memory, one or more data segments, operate on the data segments to provide an intermediate computation result, and output the intermediate computation result to external memory. Next, the intermediate computation result is read in from external memory and processed with additional data segments (and coefficients) that are read in from external memory to provide a second intermediate computation result that is output to the external memory. Having to read from and write to external memory multiple times during creation of the parity segments is undesirably slow because of, among other reasons, the mechanics of, and overhead associated with performing the external memory read and write operations, as will be understood and appreciated by those of skill in the art. Furthermore, additional performance bottlenecks occur when intermediate results of P and/or Q values are stored to disk, as is often the case in conventional stripe-based systems FIG. 6 depicts an exemplary implementation of a parity calculation module 600, which can be employed in parity operation logic 205 and dramatically reduces the number of times external memory must be read from and written to during the calculation of the parity segments, as well as the number of times that the disks 22 are accessed. This enables the parity segments to be calculated quickly and efficiently.

In accordance with certain exemplary implementations, parity calculation module 600 is advantageously implemented in hardware and, most preferably, comprises an ASIC.

As depicted in FIG. 6, parity calculation module 600 includes an input buffer 601 and one or more result buffers that are configured to hold intermediate data calculations. In this particular example, two exemplary result buffers 602, 604 are provided. Each result buffer is associated with an individual parity segment. Accordingly, in this example, result buffer 602 is associated with parity segment P, and result buffer 604 is associated with parity segment Q.

In this example, the result buffers are preferably implemented as SRAMs (Synchronous RAMs). It will be appreciated that multiple result buffers can be implemented by a single SRAM. For example, the two illustrated result buffers 602, 604 can be implemented by a single SRAM. Doing so, particularly where the parity calculation module 600 is implemented as an ASIC, carries with it advantages that include chip real estate savings, as will be appreciated by those of skill in the art.

Also included within parity calculation module 600 are one or more mathematical operator components. In the present example, two such mathematical operator components 606, 608 are provided and are each individually associated with a respective one of the result buffers 602, 604.

Specifically, in this example, mathematical operator component 606 is coupled with result buffer 602 through an output line 606a, and mathematical operator component 608 is coupled with result buffer 604 through an output line 608a. The mathematical operator components are implemented, in this example, as finite math operators embodied in hardware. In addition, each of the mathematical operator components comprises an input for data segments (input 610), an input for coefficients (P coefficient input 612a, and Q coefficient input 612b respectively), and an input for feedback from the respective result buffer with which the mathematical operator component is associated (inputs 614a, 614b respectively).

Parity calculation module 600 further includes one or more additional local memory components configured to maintain locally, data that is used in the calculation of the parity segments. For example, in the present case, local memory components 616, 618 are provided and respectively contain the precalculated parity coefficients that are respectively utilized during parity segment calculations. The parity coefficients are desirably read into the local memory component(s) so that they can be used over and over again without having to read them in multiple times from external memory, e.g. external DRAM, which can be very slow. In addition, (although not specifically illustrated) a local memory component can be allocated for a task description block that can be read in from external memory. The task description block contains all of the addresses (or pointers) where the coefficients are located. As data segments are processed, address information that is maintained in the task description block can be locally updated and maintained for further use.

This obviates the need to write any address information to external memory, which would necessarily slow the parity segment calculation down. Task description blocks and their use in the system described above are described in more detail in related patent application attorney docket No. 10001491 - 1.

Figure 1:
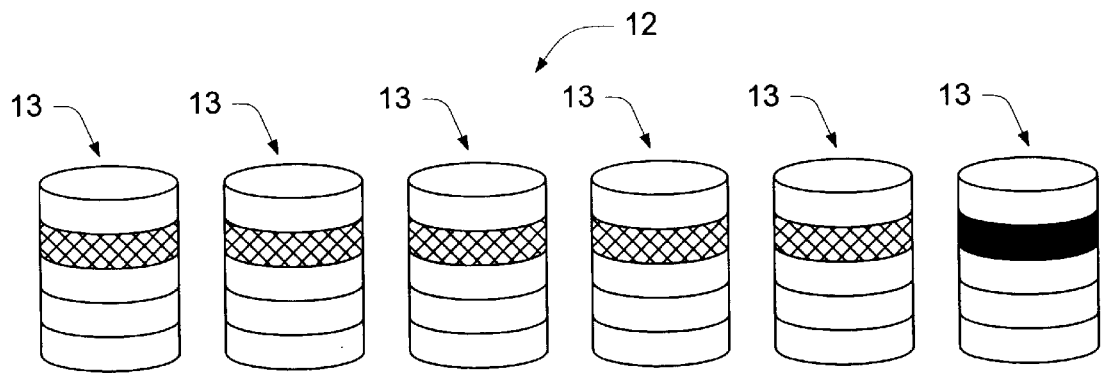
FIG. 1 is a block diagram showing N+1 redundancy grouping in accordance with the prior art.

As an overview that illustrates how the parity calculation module 600 can be used to calculate parity segments, consider the following. In a RAID disk array the data blocks and parity blocks are written to disks, as shown in FIGS. 1 and 2. All data blocks and parity blocks are saved on unique disk drives so that a failure of one drive will not cause the loss of two blocks. The data blocks and parity blocks that are associated with them are commonly referred to as a "RAID Stripe". The word "stripe" is used in the industry to refer to the data and parity blocks in the form that they are written to disk. Since the disk array has to keep track of the locations of all of the data and parity blocks in the system, it is common to have relatively large block sizes. For example, in some systems, the data and parity blocks are 64Kbytes (KB) or 256KB in size. This is an important point in the context of the discussion appearing below. The word "form" was used above because we will use the words "stripe" and "block" when referring to data in SDRAM. The term "stripe", however, generally refers also to the collection of 64KB/256KB blocks.

The parity engine or calculation module in the described system is located in a custom ASIC that operates on data stored in Synchronous DRAM(SDRAM). Of course, other types of external memory, e.g. Dual Data Rate DRAM, can be used with SDRAM constituting but one exemplary type. When the calculations are complete, a separate operation takes place to write data and parity blocks to disk.

The parity logic does not read or write to disk, it always reads or writes to external memory (SDRAM). (Sometimes the data blocks are being written to disks while the parity calculation is being performed "in the background" to improve system performance. In these cases, the data blocks are still maintained in SDRAM until the parity calculations complete.)

Referring now to an exemplary parity calculation process—Assume 64KB data blocks A, B, C, D are being processed to produce parity blocks P & Q for this example.

Data blocks A, B, C, & D are placed in memory external to the ASIC—in this case SDRAM. This external memory is much larger than is practicable to include internal to the ASIC.

A TDB (described in detail in the application incorporated by reference above) is generated in SDRAM that has the following information:

Information about the type of calculation being performed

Pointers to the starting address locations of all data blocks. For data blocks A,B,C,D, the pointers will be referred to as Aa,Ba,Ca,Da where the lower case "a" stands for address Parity block starting address locations Pa & Qa A length/size value for how big the data blocks are that are to be processed Coefficient pointer to the starting address for the coefficients to be used The queue number where the result message should be written after the calculation process completes.

A request is made to Background Task Logic (BGT) to perform the computations by writing an entry to a BGT request queue. The BGT performs tasks that are described by the TDBs. The request has information about what the operation is and a pointer to the TDB.

The BGT logic reads the request queue entry and reads in the TDB referenced by the request pointer. The TDB is saved in an internal memory inside the ASIC. In the illustrated and described implementation, the internal memory comprises an SRAM, but other types of internal memories are possible.

The BGT logic compares some field from the request queue entry with fields in the TDB to verify that the TDB is the one expected.

The BGT logic reads in the parity coefficients and stores them in an internal RAM.

The BGT logic now reads in part of the first data block and stores it in a temporary input buffer. In the FIG. 6 example, this constitutes input buffer 601. Only part of the first data block is read in because, in the described embodiment, the entire 64KB block cannot be read in. It will be appreciated that in the future this may change. In the present, however, it is just not feasible to have multiple embedded 64KB internal RAMs. In one current implementation of the logic, the internal buffers are sized at 512 bytes(1KB=1024 bytes so a 512 byte buffer=1/2KB). This is where a so-called "strip" comes into play. To avoid having to save many, many intermediate 512 byte buffers of data, a stripe is processed in 512 byte strips. Using 512 byte buffers, the data blocks are broken into 64KB/.5KB=128 segments. The terminology A1–A128 will be used in the following discussion to describe the 128 segments that make up the 64 KB data block referred to as A. Continuing with the computation process. Part of data block A is read in. To determine which part to read in, we first check the length value to make sure how much more data needs to be processed. If length >512 then, we use the Aa address pointer for the starting location and read in 512 bytes. This data is processed and a new value is saved into the TDB address pointer for A. (New Aa=Aa+512) Note that the TDB is stored in an internal RAM so the pointer updates cause no external memory accesses. P & Q buffers now contain intermediate data for the A1 portion of the A1, B1,C1,D1 strip of the stripe. If length <512 then, we use the Aa address pointer for the starting location and read in "length" bytes. This data is processed and a new value is saved into the TDB address pointer for A—(New Aa=Aa+length). P & Q buffers now contain intermediate data for the A1 portion of the A1, B1,C1,D1 strip of the stripe.

This process is repeated for the remaining block segments (i.e. B, C, & D for this example).

P & Q segments are then written out to SDRAM at locations Pa & Qa, and the Pa & Qa pointers are updated in the same manner as data block pointers were updated.

Now the length value is updated. If length>512, New length=length—512. Since length is a positive number, we still have strips to process. The above-described process is repeated from the point where the BGT logic reads in part of the first data block and stores it in temporary input buffer 601 until the length value is less than or equal to 512.

If the length value is less than or equal to 512, length=0 and processing for the whole stripe has completed. For this example the process of reading in part of the first data block, storing it in a temporary input buffer and processing it as described above will have been executed 128 times. The first time through will process A1, B1,C1, D1 and write out P1& Q1. The last time through, A128, B128, C128, D128 will be processed and P128 & Q128 will be written.

It will be appreciated and understood that the above described process can perform calculations on any depth of data blocks. The length value can be anything from 8 bytes in size to many megabytes (MB). One restriction with the specific approach described above is that the length must be an integer number of 8 byte words since we perform our calculation 8 bytes at a time. In the generic case, the width of processing is unimportant.

Subsequently, the process writes a completion indication to the result queue that was listed in the TDB. The result entry will contain status bits that indicate if the process was successfully completed or if it had errors. The process can now be repeated for additional parity segments. patent application attorney docket No. 10001494-1.

Figure 7:
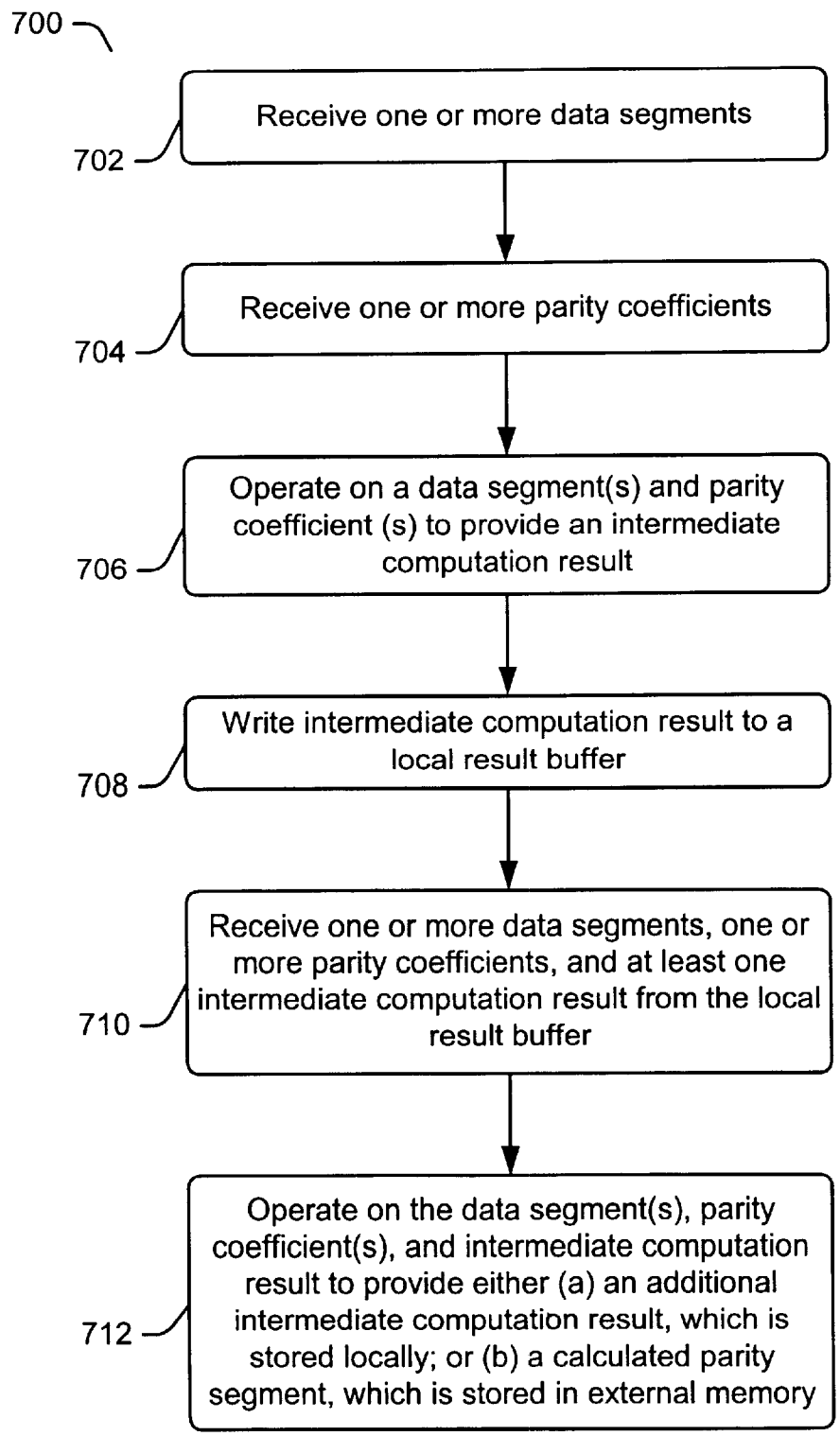
FIG. 7 is a flow diagram that describes steps in a method in accordance with certain exemplary implementations of the present invention.

FIG. 7 is a flow diagram that describes an exemplary method 700 in accordance with the described exemplary implementations, which can be implemented using parity calculation module 600.

Step 702 receives one or more data segments. In the illustrated example of FIG. 6, a data segment is received by each of the mathematical operator components 606, 608. Step 704 receives one or more parity coefficients. In this example, parity coefficients are received by each of the mathematical operator components 606, 608. Advantageously, the parity coefficients can be locally maintained in local memory components (such as components 616, 618) so that the system need not access external memory multiple times.

Assuming that, at this point in the processing, this is the first pass through the mathematical operator components 606, 608 for purposes of calculating one or more parity segments, step 706 operates on at least one data segment and on at least one parity coefficient to provide an intermediate computation result. In the present example, each of the mathematical operator components 606, 608 can operate on one or more of the data segments and each segment's associated coefficient in order to provide the intermediate computation result.

On the first pass through the mathematical operator components, feedback that is provided by the result buffers via lines 614a, 614b does not affect the computations that are performed by the mathematical operator components. This can be done a number of ways. For example, any feedback that is provided on the first pass can simply be ignored by the mathematical operator components. The feedback can also simply be zeroed out on the first pass through. Additionally, although less efficient, the relevant contents of the SRAM can simply be zeroed out for the first pass through. This is less desirable because it takes more time and processing overhead.

Having operated on the data segment(s) and parity coefficient(s) to provide the intermediate computation result, step 708 then writes the intermediate computation result to one or more local result buffers. In the presently described example, the result buffer comprises an SRAM. In the FIG. 6 implementation, there are two separate SRAMs-one for each parity segment. Using an SRAM to implement the result buffer(s) is advantageous in that operations can take place on each edge of a clock in the clock cycle. This will become more apparent below.

After the intermediate computation result is written to the result buffer, step 710 receives one or more data segments, one or more parity coefficients, and at least one intermediate computation result from the result buffer. This step is implemented, in this example, by each of the mathematical operator components 606, 608. Specifically, the components receive the data segment(s) and coefficient(s) as described above. Additionally, however, the mathematical operator components 606, 608 also receive, via feedback inputs 614a, 614b, the respective intermediate computation results that were previously written to the result buffers. The mathematical operator components 606, 608 then operate, at step 712, on the data segment(s), coefficient(s), and the intermediate computation results to either provide an additional intermediate computation result, or a calculated parity segment. If another intermediate computation result is provided, steps 708–712 are repeated until the parity segment is calculated.

Use of one or more SRAMs to implement multiple local result buffers is advantageous in that multiple operations can be performed within one clock cycle. Specifically, within every clock cycle, intermediate computation results can be retrieved from the result buffers, operated upon by the mathematical operator components, and written back into the result buffers for the next clock cycle. This approach is extremely fast and greatly improves upon techniques that utilize multiple accesses to external memory as described above.

By maintaining intermediate P and Q parity values internally (e.g., in local result buffers), the above method 700 tends to minimize the number of external (SDRAM) memory accesses. Upon completion of the mathematical processing for a strip, the resulting strip parity segments are stored in the external memory. Method 700 is then repeated until the entire stripe parity blocks are processed and stored in the external memory. Following that, the final parity results for the entire stripe are written to the applicable disk 22 (FIG. 2).

Figure 8:
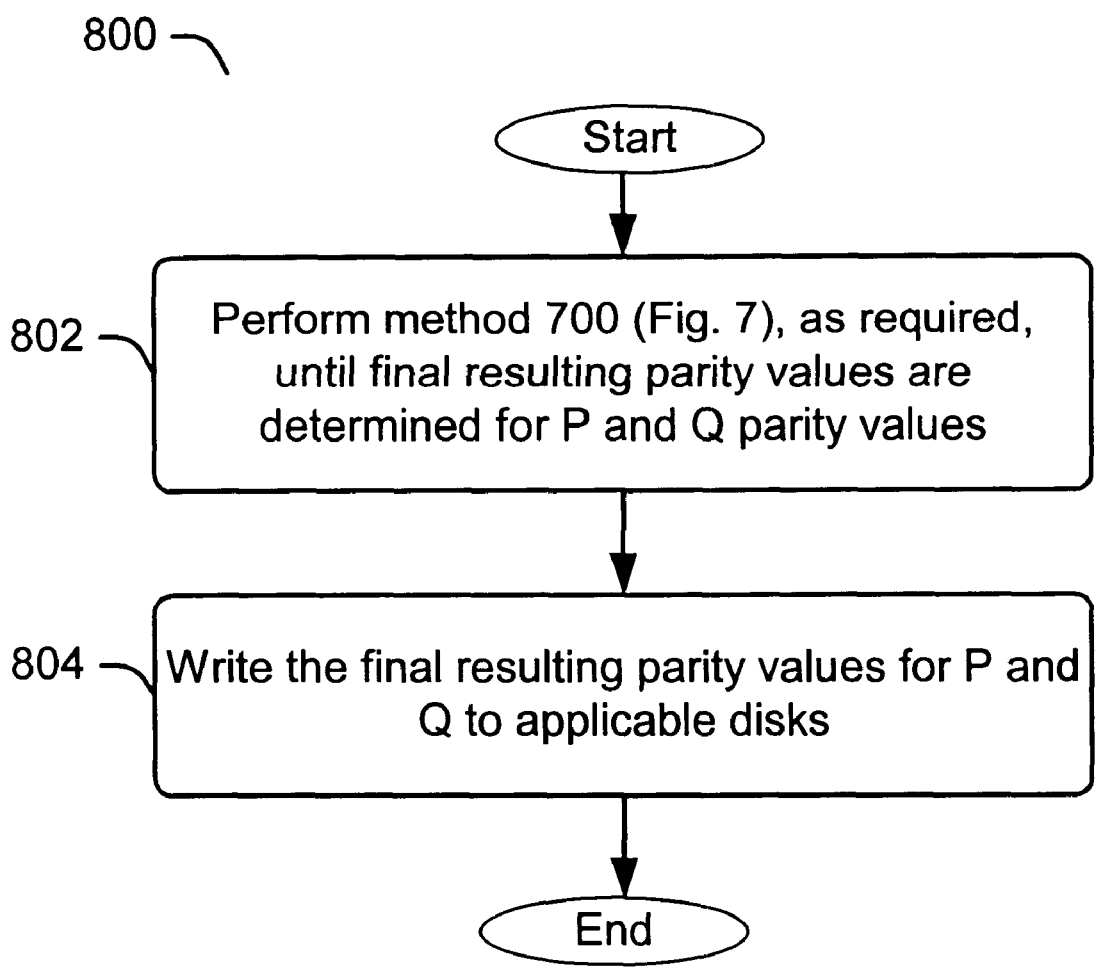
FIG. 8 is a flow diagram that describes steps in a method in accordance with certain exemplary implementations of the present invention.

This is depicted in the higher-level flow diagram of FIG. 8, wherein a method 800, which includes method 700, is provided for accessing disks 22.

In step 802, method 700 is repeated for each strip until the entire stripe has been processed. Next, in step 804, the final parity values for P and Q are written from external memory to their applicable disks.

Conclusion

The parity calculation architecture described above has a number of advantages over the prior art. One significant advantage is that the architecture allows parity computations to be performed by hardware-based logic, without requiring significant complexity in the hardware. To provide this advantage, a microprocessor performs preliminary work such as designating the various parameters to be used in the calculations. Once the proper coefficients and data/parity segments have been designated, the hardware can perform the actual calculations in similar or identical ways, regardless of the particular type of operation that is requested.

By eliminating the need for the hardware to perform multiple reads of the data segments and write intermediate parity value results to external memory, the various improved methods and arrangements have substantially removed a performance bottleneck that plagues conventional stripe-based systems.

Although some preferred implementations of the various methods and arrangements of the present invention have been illustrated in the accompanying drawings and described in the foregoing detailed description, it will be understood that the invention is not limited to the exemplary implementations disclosed, but is capable of numerous rearrangements, modifications and substitutions without departing from the spirit of the invention as set forth and defined by the following claims.

What is claimed is:

1. A method comprising:

selectively reading a data strip within a stripe-based data storage array;

determining at least one parity coefficient for each of at least two parity segments that are storable within the stripe-based data storage array;

calculating at least one intermediate parity value for each of the at least two parity segments for the data strip based on at least one previously read data strip and applicable determined parity coefficients;

temporarily storing a latest intermediate parity value for the strip in a local buffer;

storing final parity values for the data strip in an external memory; and only upon determining final parity values for an entire stripe, writing the final parity values for the entire stripe to corresponding parity value data segments within the stripe-based data storage array.

2. The method as recited in claim 1, wherein the stripe-based data storage array includes an N+2 disk array.

3. The method as recited in claim 2, wherein calculating the at least one intermediate parity value based on at least one previously read data strip further includes calculating a P intermediate parity value and a Q intermediate parity value based on the previously read data strip.

4. The method as recited in claim 1, wherein the local buffer includes random access memory (RAM).

5. The method as recited in claim 1, wherein selectively reading the data strip within the stripe-based data storage array further includes sequentially reading data strips arranged within a stripe of the stripe-based data storage array.

6. The method as recited in claim 1, wherein selectively reading the data strip within the stripe-based data storage array further comprises reading individual data strips only once.

7. The method as recited in claim 1, wherein calculating the at least one intermediate parity value based on the previously read data strip further includes selectively multiplying the previously read data strip by the at least one parity coefficient to determine the at least one intermediate parity value.

8. The method as recited in claim 1, wherein the steps of claim 1 are repeated for each subsequent data strip in the stripe-based data storage array such that strip addresses need only be accessed once.

9. The method as recited in claim 8, wherein the strip addresses are provided in random access memory (RAM) as pointers.

10. An apparatus comprising:

a stripe-based data storage array having selectively readable data strips therein; and logic operatively coupled to the stripe-based data storage array and configured to selectively read the data strips, determine at least one parity coefficient for each of at least two parity segments that are storable within the stripe-based data storage array, while reading subsequent data strips, calculate at least one intermediate parity value for each of the at least two parity segments based on at least one previously read data strip and applicable determined parity coefficients, temporarily store a latest intermediate parity value in a local buffer, store final parity values for each data strip in an external memory, and only upon determining final parity values for the entire stripe, writing the final parity values for the entire stripe to corresponding parity value data segments within the stripe-based data storage array.

11. The apparatus as recited in claim 10, wherein the stripe-based data storage array includes an N+2 disk array.

12. The apparatus as recited in claim 11, wherein the logic is further configured to calculate a P intermediate parity value and a Q intermediate parity value based on at least one previously read data strip.

13. The apparatus as recited in claim 10, wherein the local buffer includes random access memory (RAM).

14. The apparatus as recited in claim 10, wherein the logic is further configured to sequentially read data strips arranged within a stripe of the stripe-based data storage array.

15. The apparatus as recited in claim 10, wherein the logic is further configured to read individual data strips only once while sequentially reading data strips arranged within the stripe.

16. The apparatus as recited in claim 10, wherein the logic is further configured to selectively multiply the read data strip by the at least one parity coefficient to determine the at least one intermediate parity value.

17. The apparatus as recited in claim 10, wherein the logic is configured to determine unique parity values for each strip in the stripe-based data storage array in a manner such that strip addresses need only be accessed once.

18. The apparatus as recited in claim 17, wherein the strip addresses are provided in random access memory (RAM) as pointers.

* * * * *